United States Patent [19]

Schäfer

[11] Patent Number: 4,773,732
[45] Date of Patent: Sep. 27, 1988

[54] OPTICAL INTERFEROMETRIC APPARATUS WITH AN ELECTRICALLY CONTROLLABLE INTENSITY TRANSMISSION FACTOR

[75] Inventor: Fritz P. Schäfer, Goettingen-Nikolausberg, Fed. Rep. of Germany

[73] Assignee: Max-Planck-Gesellschaft zur Foederung der Wissenschaften e.V, Goettingen, Fed. Rep. of Germany

[21] Appl. No.: 808,726

[22] Filed: Dec. 13, 1985

[30] Foreign Application Priority Data

Dec. 21, 1984 [DE] Fed. Rep. of Germany ....... 3446930

[51] Int. Cl.[4] .......................... G02B 27/10; G02F 1/03
[52] U.S. Cl. .................................... 350/163; 350/174; 350/355; 350/356
[58] Field of Search ............... 350/355, 356, 169, 174, 350/163

[56] References Cited

U.S. PATENT DOCUMENTS

| | | | |
|---|---|---|---|
| 3,517,982 | 6/1970 | Fonda-Bonardi | 350/163 |
| 3,586,416 | 6/1971 | De Bitetto | 350/356 |
| 4,335,939 | 6/1982 | Stovell et al. | 350/385 |
| 4,474,435 | 10/1984 | Carlsen et al. | 350/381 |

FOREIGN PATENT DOCUMENTS

| | | |
|---|---|---|
| 2259244 | 3/1971 | Fed. Rep. of Germany . |
| 1018806 | 2/1966 | United Kingdom . |
| 1280069 | 7/1972 | United Kingdom . |
| 1512453 | 6/1978 | United Kingdom . |

OTHER PUBLICATIONS

Abraham et al., "The Optical Computer" Scientific American, Feb. 1983, pp. 85-93.

Primary Examiner—Bruce Y. Arnold
Attorney, Agent, or Firm—Kinzer, Plyer, Dorn, McEachran & Jambor

[57] ABSTRACT

An optical interferometric apparatus in which the intensity transmission factor is electrically controllable between at least one radiation beam input and at least one radiation beam output includes an interferometric device with a beam splitter for producing two coherent partial beams which pass via corresponding partial beam paths to a beam combining device where they interfere. In at least one of the partial beam paths there is disposed an electro-optical device in which the optical length of the portion of the partial beam path in question passing through it is electrically changeable, e.g., by means of the refractive index. The partial beams are combined strictly parallel with each other, so that the output beam provided by the beam combining device has a constant phase across its width and the intensity can be varied essentially between the full intensity of the input beam and zero by an appropriate change of the optical path length.

14 Claims, 7 Drawing Sheets

OPTICAL INTERFEROMETRIC APPARATUS WITH AN ELECTRICALLY CONTROLLABLE INTENSITY TRANSMISSION FACTOR

The present invention relates to an optical apparatus, which has an electrically controllable transmission function, more specifically an electrically controllable intensity transmission factor.

BACKGROUND OF THE INVENTION

In the field of optics and particularly in the field of laser technology it is increasingly frequently desirable to change the direction and/or to vary the intensity of a beam of optical radiation—referred to below briefly as a "light beam"—by means of an external signal. If there are no very demanding requirements as to the speed with which these changes are to proceed this object may be performed by mechanically or electro-mechanically moved optical components, e.g. by pivoting or rotating mirrors or prisms. The object may also be fulfilled by a piezoelectrically controlled change of the width of the air gap between two prism surfaces, at one of which the total reflection of an incident beam is partially suppressed by the closely adjacent other surface. If there are demanding requirements as regards time acousto-optical deflectors and modulators are used. However, if the requirements as regards time are extremely demanding and switching or modulating times of only a few nanoseconds are required, only electro-optical components can be used for this purpose. In this connection Pockels cells may be primarily considered which have almost completely replaced the old Kerr cells which are associated with many disadvantages. In a Pockels cell the refractive indices for the ordinary beam and the extraordinary beam are altered to a differing degree in an electro-optical crystal by the application of an electric field which effects a change in the double refraction of the crystal. In this manner the polarization of a light beam passing through it can be reorientated in dependence upon the length of the crystal and the magnitude of the applied field strength so that a change in direction and/or amplitude of the light beam can occur in an optical crystal element by virtue of its double refraction. Such devices have been used in laser technology in very many different embodiments for different purposes. If they are used within a laser resonator these devices can, for instance, be used in order substantially to change the efficiency of a resonator at a predetermined time within a few nanoseconds or periodically to modulate it in the interval of a resonator period. In the first case so called giant pulses could be produced; in the second ultra-short laser pulses are produced via the so called active phase coupling. In the so called cavity-dumping the entire light energy stored in the resonator can be coupled out at a predetermined time with this device and directed in a predetermined direction outside the resonator. Outside a laser resonator such devices are frequently used for the control of the intensity of the laser beam or for modulation for the purpose of the transmission of communications.

A considerable disadvantage of Pockels cells is the very high voltage (in general many kilovolts) which is necessary for the operation of a Pockels cell in the known apparatus and whose application to the Pockels cell is very difficult to achieve within a few nanoseconds with electronic components.

Other known arrangements which are seldom used (such as, for instance, prisms of electro-optical crystals whose deviation of the light depends upon the magnitude of the applied electric field) have the disadvantage that they are scarcely usable in practice due to the small change in angle of the light beam on the application of even extremely high field strengths.

Logic circuits operating purely optically, such as AND, OR and NOT components are also known which substantially comprise a Fabry-Perot-Interferometer which includes a medium whose refractive index is a non-linear function of the light intensity. However, relatively high light intensities are required for these which must be precisely controlled; furthermore a control by an electrical signal is preferable for many purpose.

U.S. Pat. No. 3,586,416 discloses a light modulator employing an interferometer, in which an incident beam is divided into two partial beams which are recombined at a small angle to produce a spacial pattern of interference fringes at a predetermined position. By providing at or close to that position a gate or mask comprising for instance transparent slots in an opaque support, positioned to allow the fringes to be aligned to the slots, greater than 50% of the output beam will emerge from the system. A Kerr or Pockels cell is provided in one of the partial beam paths of the interferometer. The cell is controlled by an electrical signal to change the optical path length of said one partial beam path, and if the optical path length is changed by a half wave-length, the entire fringe system is shifted half a fringe width. The space-selective gate or mask will then intercept most of the shifted fringe pattern with the result, that very little light now emerges from the system. However, this known light modulator allows modulation only between about 80% and about 20% of the maximum intensity, and the space-selective mask is a delicate component which must be exactly adjusted.

BRIEF DESCRIPTION OF THE INVENTION

It is an object of the present invention to provide a novel electro-optical apparatus which avoids the drawbacks of the prior art, and with which the objects referred to above, and also new and unexpected objects can be achieved, and which allows the full control of the intensity with significantly lower field strength and in a more simple manner than now.

According to the invention, these objects are achieved by arranging said beam combining device and said partial beam path such that said coherent partial beams are combined strictly parallel with each other, so that the beam has an essentially constant phase across its cross-section. The combined beam is passed from said combining device to a radiation beam exit through a combined-beam path free of any diffraction-fringe space-selective element.

The interferometric apparatus in accordance with the invention has the major advantage that the intensity of the output beam(s) can be controlled between 100% and 0%, since no space-selective element, such as a multiple-slot mask, is present which prevents a modulation between essentially full and zero intensities, because such a mutli-slit mask can neither pass nor block all of the light, because the intensity of the diffraction fringes is no squarewave function. Further, the apparatus according to the invention can be controlled with relatively small voltages which, in turn, can be provided without difficulty by semiconductor components, and can be varied correspondingly rapidly. The present apparatus is also characterized by a relatively small and robust construction.

In an advantageous embodiment of the present apparatus the electro-optical device which alters the optical path lengths, e.g. a crystal whose refractive index is a function of field strength, is traversed many times by one or both partial beam paths so that the voltage change necessary for a predetermined change in intensity of the exiting or output beam or beams of radiation or for a predetermined switching function is particularly small.

BRIEF DESCRIPTION OF THE DRAWINGS

Exemplary embodiments of the invention will be described in more detail below with reference to the drawings, in which.

DETAILED DESCRIPTION

The principle of the invention can most simply be explained with reference to FIG. 1 which shows a simple arrangement for realising the inventive concept. An entering light beam which is split by a fifty per cent beam splitter ST1 into two coherent light beams 1 and 1' of the same intensity comes from direction A. The partial beam 1 passes via a mirror Sp1 and through an electro-optical element EO1 to a beam splitter ST2 whilst the partial beam 1' also reaches the beam splitter ST2 through an electro-optical element EO2 and then via a mirror Sp2. The beam splitter operates as beam combining device, which combines the partial beams strictly parallel with each other, so that the combined beam(2) have a constant phase across their width (normal to the propagation direction) and no interference fringes are produced across the combined beam. This applies also to the beam combining devices of the embodiments described with reference to FIGS. 2 to 9. Depending upon the relative path difference of the two partial beams these interfere in such a manner that a portion of the light goes in direction C and another portion in direction D. The electro-optical elements contain materials whose refractive index is dependent on the applied voltage or field strength. If now, for instance, the voltage applied to the electro-optical element EO1 is increased, its refractive index changes and thus also the optical path length for the partial beam 1; if the total change of the voltage is sufficiently large a path length change of a plurality of wave lengths can occur. If the change of the refractive index is linear with time a variation with time of the intensity of the light for instance at exit C can be achieved which may be described by a ($\sin^2$) function whilst at exit D a change in the intensity occurs which may be described by a ($\cos^2$) function. The same applies for the change of the optical path length in the partial beam 1' by application of a voltage to the electro-optical element EO2. By virtue of anti-phase operation of the two electro-optical elements the difference in the optical path lengths (at a given voltage change) can be changed by twice as much. It is of course also sufficient merely to pass one partial beam through an electro-optical element and to provide an appropriate non-electro-optically active glass in the other partial beam for path length compensation. It is worth noting that, if beam splitters ST1 and ST2 function precisely, the full intensity entering at A can be directed either to exit C or fully to exit D on application of a suitable voltage, since no space-selective element, as a multi-slit mask, is interposed in the path of the output beam, which element would obstruct part of this beam and reduce its intensity swing (degree of intensity modulation). The same applies when entrance B is used instead of entrance A. it is the case that when in the state at which the intensity entering at A exits at D the intensity entering at B would at the same time exit at C. In the reverse case when the intensity entering at A exits at C the intensity entering at B would exit at D. One can see that the beam of radiation is guide from two inputs to two outputs in dependence on the switching state in a manner similar to the current in the electrical case in a two-pole switch (FIG. 2). This arrangement can therefore be termed an electro-optical switching means.

Figure 1:
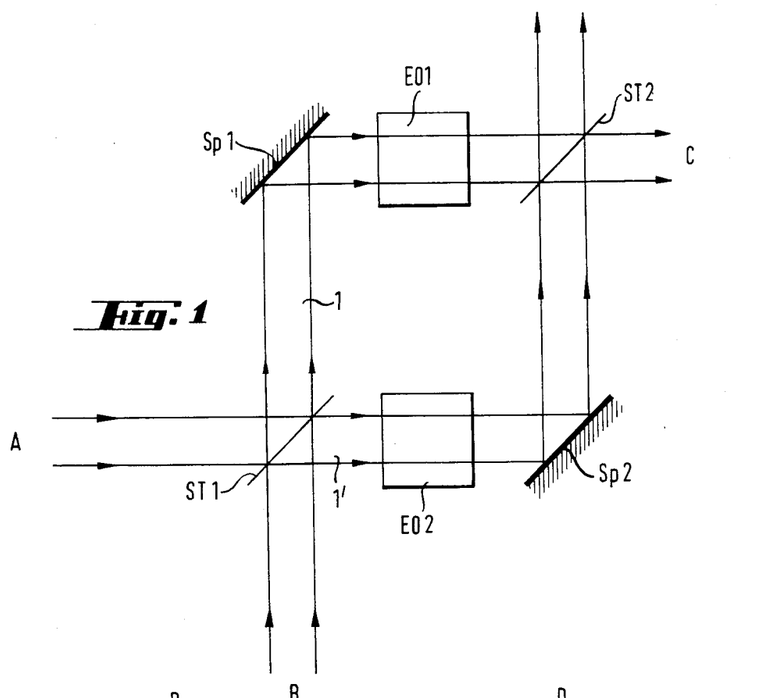
FIG. 1 is a schematic representation of a first embodiment of the present optical apparatus.
Figure 2:
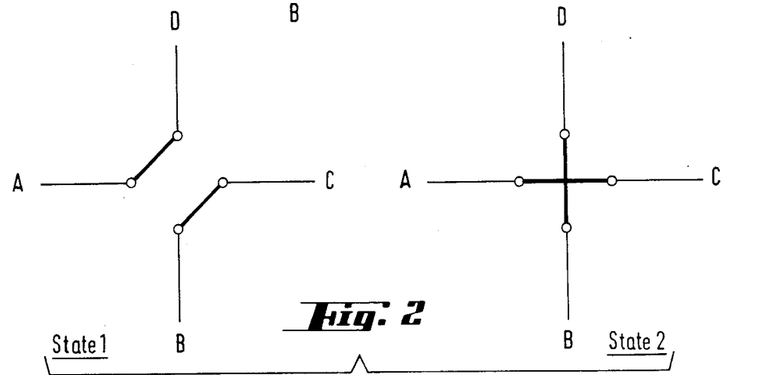
FIG. 2 shows electrical equivalent-circuit diagrams for two switching states of the apparatus of FIG. 1 when it is operated as an "optical switching means"
Figure 3:
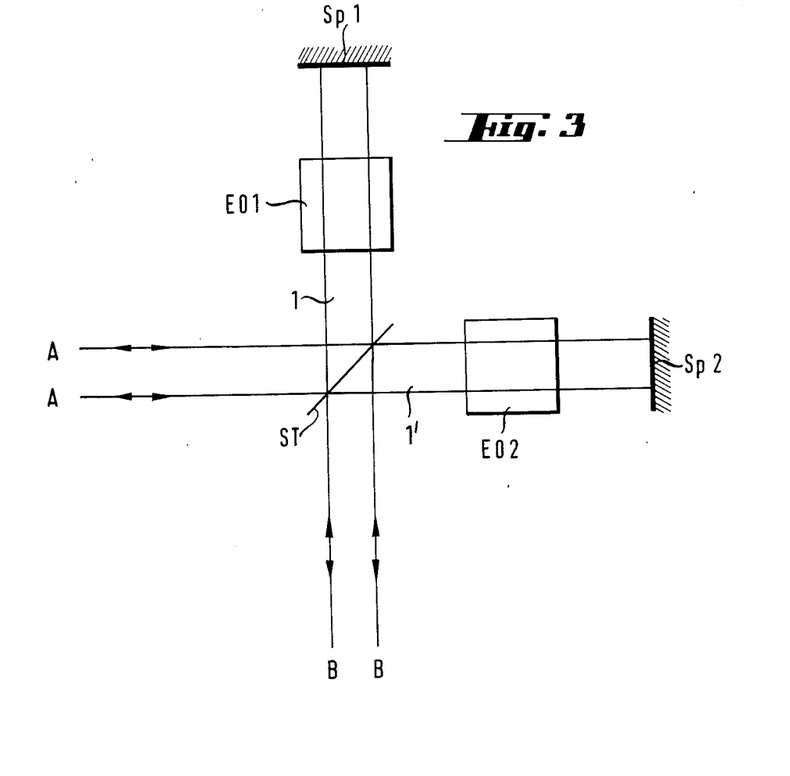
FIG. 3 is a schematic representation of a second embodiment of the invention.
Figure 4:
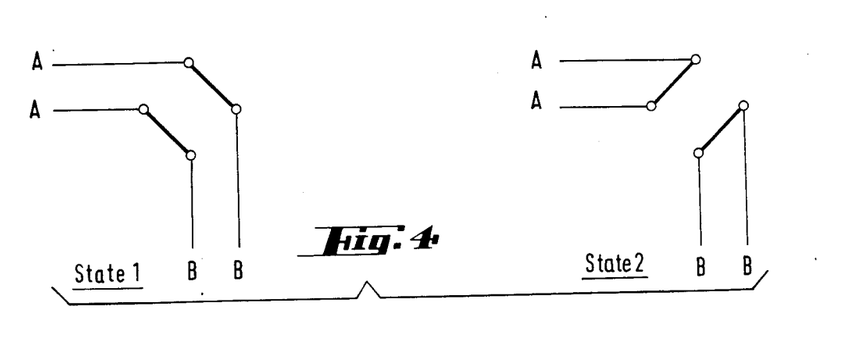
FIG. 4 shows electrical equivalent-circuit diagrams for the two switching states of the apparatus of FIG. 3.

Those skilled in the art will recognise that the arrangement of FIG. 1 relates to a Mach-Zehnder interferometer in which an electro-optical element is used in the beam path of either one or of both the separate coherent partial beams. It is now immediately clear that in a corresponding manner a Michelson interferometer with at least one electro-optical element of the described type can also be provided so that according to choice an input (output) A is connected to output (input) B in a first operation or switching state whilst in the other switching state A and B are separated from one another because the light shone in at A or B is 100 per cent reflected back on itself and not to the other output or input. Such an "electro-optically active" Michelson interferometer is schematically illustrated in FIG. 3; FIG. 4 shows the corresponding electrotechnical equivalent-circuit diagram.

Figure 5:
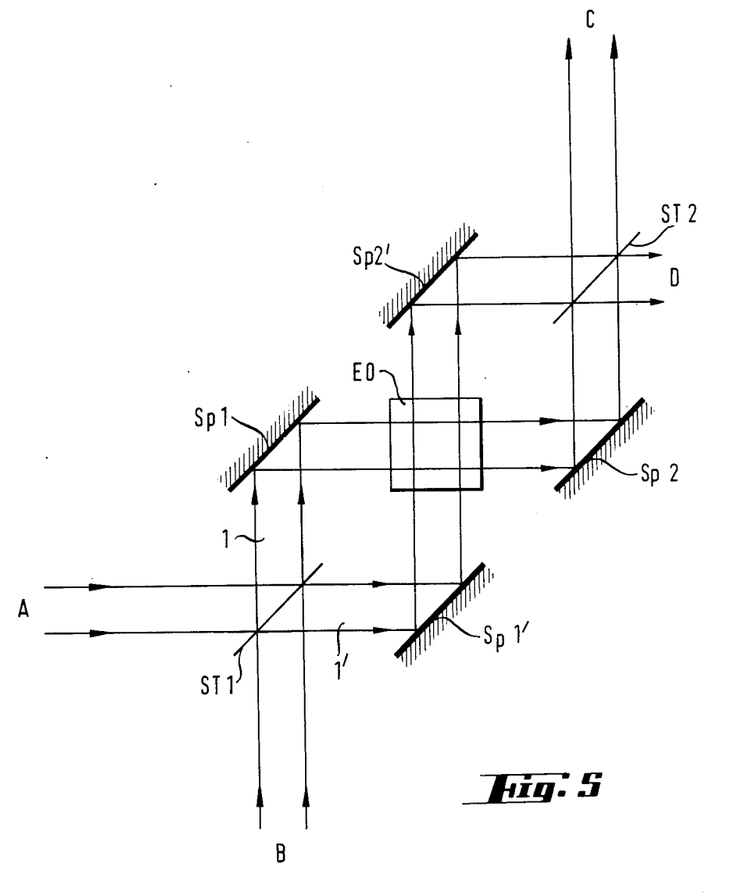
FIG. 5 shows a modification of the apparatus of FIG. 1.
Figure 6:
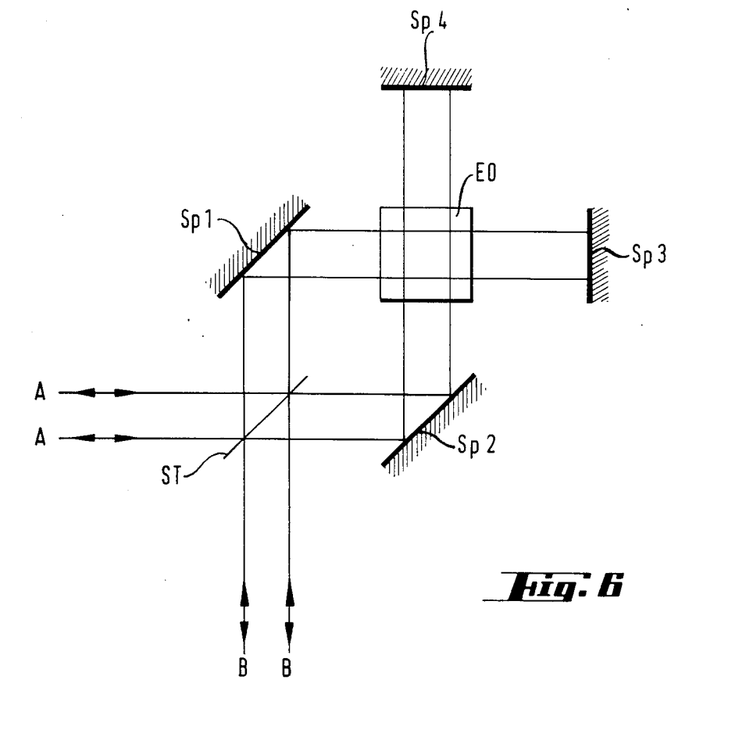
FIG. 6 shows a modification of the apparatus of FIG. 3.

A further advantageous embodiment of the basic ides of FIG. 1 is illustrated in FIG. 5 in which the partial beams 1 and 1' are each diverted again through 90° by virtue of the use of two further mirrors Sp1' and Sp2' and then intersect at 90°. At the intersection region of the two partial beams, there is, as shown, an electro-optical element EO which has the form of a parallelopiped polished on all sides which is provided at its bottom and top surface with electrodes. The material of the electro-optical element is of such a composition that, by application of the voltage, the refractive index reduces for example in the direction of the partial beam 1 but on the other hand increases in the direction of the partial beam 1'. By virtue of this arrangement the expensive electro-optical element which in general comprises a crystal cut in the correct manner is used twice. A corresponding electro-optical Michelson interferometer with double usage of the electro-optical element is schematically illustrated in FIG. 6.

Figure 7:
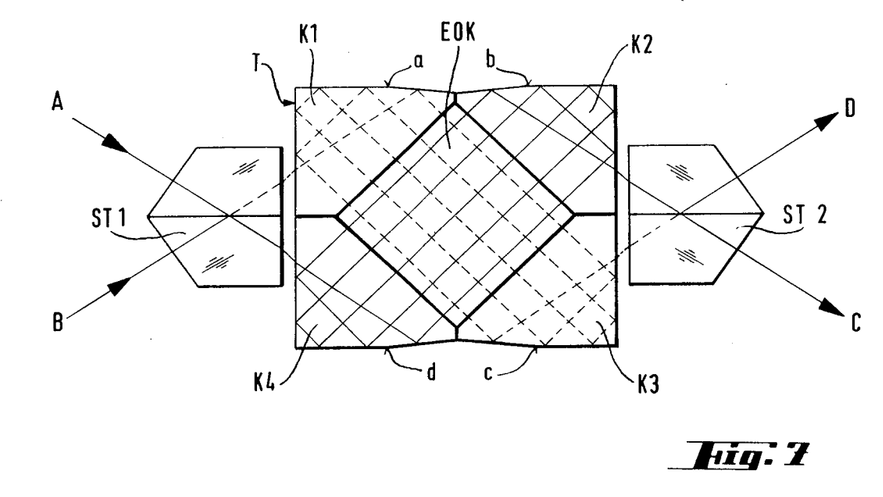
FIG. 7 is a schematic representation of a fourth, preferred embodiment of the invention.

A particularly advantageous practical embodiment of the principle explained with reference to FIG. 1 is illustrated in FIG. 7. In this embodiment of the invention the partial beams must traverse several times the crystal serving as an electro-optical element whereby a large path difference can be achieved with small voltages. An electro-optical crystal EOK can be used here as the active element which comprises a parallelopiped polished on all sides of potassium dihydrogen-phosphate doped with deuterium (KD*P), e.g. with dimensions $35 \times 24 \times 7$ mm$^3$. It is so cut that the optical axis is perpendicular to the plane of the paper and the crystallographic axes $x_1$ and $x_2$ lie on the diagonals of the rectangle. Vapour deposited gold films on the top and bottom surface serve as electrodes which are contacted with resilient engagement by feedlines of a not illustrated control voltage source. The electro-optical crystal is situated in a surrounding external optical structure T of quartz glass or another suitable transparent material which, as shown in the Figure, is composed of four bonded individual parts, K1, K2, K3 and K4 which in plan have somewhat the shape of right-angled triangles with cut-away corners at the hypotenuse. The surrounding optical structure T is thus externally substantially parallelopiped shaped and forms a hollow space extending diagonally with respect to the optically polished exterior sides into which the crystal constituting the electro-optical element EOK fits as exactly as possible. The gap of about 1/10 mm which is technically unavoidable between the surrounding quartz glass structure T and the electro-optical crystal EOK is filled with an immersion liquid whose refractive index lies between that of the quartz glass and that of the KDP crystal to avoid reflection losses. Two quartz glass blocks of the illustrated shape disposed adjacent one another serve as the beam splitters ST1 and ST2, which blocks define between them an air gap of such a thickness that at the operational wavelength a precisely loss-free beam splitting in the ratio of 1:1 is achieved by partially suppressed total reflection. This air gap can be set very precisely by a film of the required thickness of an appropriate material, e.g. SiO$_2$, which is vapour deposited under vacuum on the edges of the surfaces which are to be laid together. The two beam splitters ST1, ST2, the surrounding optical structure T and the electro-optical crystal EOK are secured by pressing onto an optically flat base plate of quartz glass or Zerodur by means of an adjustable mechanical mounting. In FIG. 7 the beam path of the light beam incident at input A and of the partial beam passing through the beam splitter ST1 are shown in full lines whilst that of the partial beam reflected from ST1 is shown in chain lines. One can see that by virtue of total reflection at the walls of the glass trough for each of the two partial beams they pass five times through the electro-optical crystal in such a manner that the directions of the beams drawn in solid lines and in chain lines are perpendicular to one another which results in the optical path lengths for the one partial beam being correspondingly substantially increased and for the other reduced to the same extent on the application of an electric field.

Figure 8:
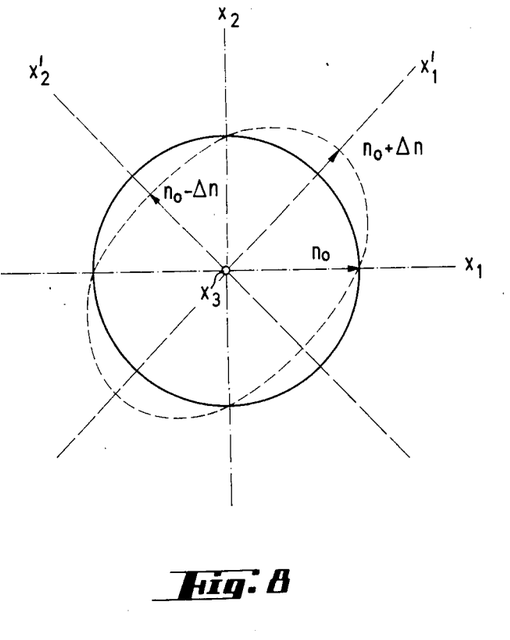
FIG. 8 is a representation of the index ellipsoid of an electro-optically active crystal used in the apparatus of FIG. 7.

When calculating the voltage change $\Delta u$, which is necessary for completely switching from output C to output D or vice versa it is to be noted that in accordance with the index ellipsoid illustrated in FIG. 8 the refractive index $n_0$ changes to $n_0 + \Delta n$ or $n_0 - \Delta n$ in the direction of the axes $x'_1$ and $x'_2$ of the index ellipsoid (along which the variation of the index of refraction has a maximum and which are parallel to the partial beam paths) on the application of a voltage. whereby it is known from the crystal optical handbook that the optical path length change $l \cdot \Delta n$ in a crystal in which the path length of a partial beam is l, is given by $$l \cdot \Delta n = \frac{n_0^3 \cdot r_{63} \cdot \Delta u \cdot l}{2 d} \quad (1)$$

whereby $r_{63}$ is the electro-optical constant of the crystal in question for the operational wavelength and d is the thickness of the crystal in the direction of the electric field. The change in path length for a partial beam must be exactly $\lambda/4$ so that a complete switching occurs from one output to the other. With the relationship given above one obtains the relationship for the required change in switching voltage $\Delta u$ $$\Delta u = \frac{\lambda \cdot d}{2 \cdot n_0^3 \cdot r_{63} \cdot l} \quad (2)$$

If the arrangement is to be used for instance in a neodymium-YAG laser ($\lambda = 1059$nm), then for KD*P, $n_0 = 1.491$, $r_{63} = 26.4$ pm/V so that for the given dimension d = 7 mm and l = 175 mm (corresponding to passing five times through the 35 mm long crystal) the switching voltage is $\Delta u = 242$ V. This low switching voltage is easily controllable with semiconductor devices. With shorter, e.g. visible, wavelengths the switching voltage is even lower.

Reference is also made to the fact that in the arrangement of FIG. 7 the first and last total reflection in the glass structure T each occur at a partial surface which is angled inwardly through about 5° in the indicated manner fron the points a, b, c, d marked with the arrow to the adjacent cement point with respect to the adjacent wall. In this manner the coupling in and coupling out of the partial beams into or out of the quartz structure T is rendered possible since at the first or last impingement of the beam of radiation on the wall no total reflection occurs but instead a reflection-free passage through the wall if polarised light is used whose electrical vector oscillates parallel to the plane of the drawing. The passage of the light through those walls of the beam splitters which extend perpendicular to the air gap is also essentially reflection-free. Obliquely positioned entry walls must however be made non-reflecting by appropriate coatings.

Figure 9:
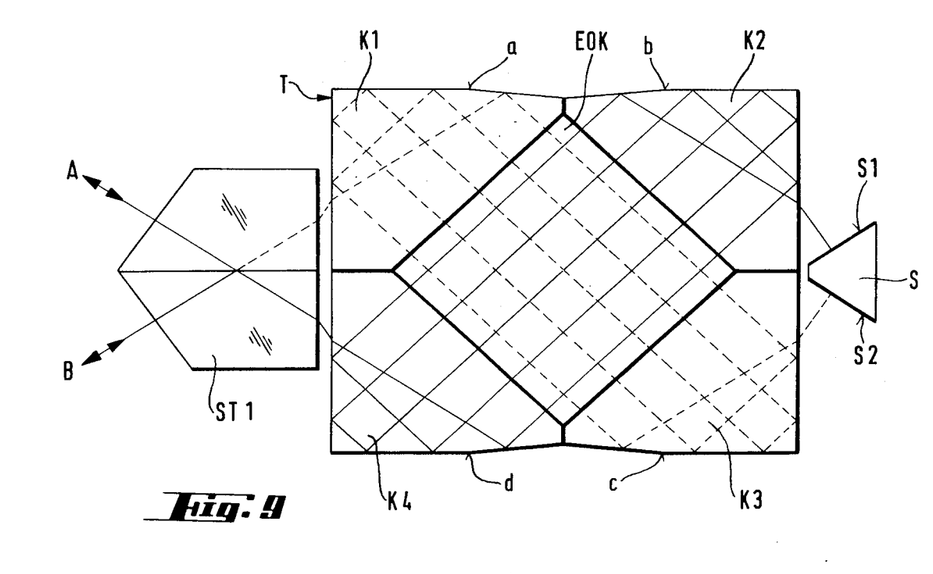
FIG. 9 is a schematic representation of a modification of the apparatus of FIG. 7.

Finally, FIG. 9 shows how the arrangement of FIG. 7 is to be altered in order to produce a corresponding electro-optical Michelson interferometer. For this purpose only a mirror block S is used instead of the beam splitter ST1 of FIG. 7, which block comprises for instance a glass prism whose surfaces S1 and S2 have a reflecting coating applied to them so that the two partial beams are each precisely reflected back on themselves. The switching voltage u for this embodiment is precisely half as big as that required in FIG. 7 since each partial beam now passes 10 times through the crystal.

It may now easily be seen that by application of a certain biasing potential any desired state can be achieved, for instance with reference to FIG. 7, that a beam entering at A exits entirely at D or at C or beams of the same intensities exit at C and D. By superimposing an alternating voltage of suitable amplitude and frequency the intensities at the outputs C and D can be modulated to be in anti-phase or switched by applying square wave impulses between the outputs C and D. Furthermore, any desired superposition of different impulse shapes are possible so that a remarkable multiplicity of uses with widely varying requirements becomes possible with the described invention.

Instead of the described types of interferometric devices other known interferometric devices can of course also be used in which the partial beam paths are sufficiently separated so that an electro-optical device of the described type can be used.

I claim:

1. An optical interferometric apparatus with an electrically controllable intensity transmission factor between at least one radiation beam entrance and at least one radiation beam exit, comprising:
   a beam splitter which receives a beam of optical radiation from said entrance and splits the received beam into first and second coherent partial beams, projecting those partial beams along first and second partial beam paths respectively;
   a beam combining device which receives said partial beams from said partial beam paths and combines them into at least one combined beam having a predetermined cross section;
   said beam combining device and said partial beam paths being arranged to combine said partial beams strictly parallel with each other so that the combined beam has an essentially constant phase across its cross-section;
   said combined beam being passed from said combining device to said radiation beam exit through a combined beam path free of any diffraction-fringe space-selective element;
   an electro-optical device in at least one of said partial beam paths, said device having an electrically controllable index of refraction to vary the optical length of said partial beam path; and
   reflecting means, in the partial beam paths, for diverting the partial beams so that they intersect at least once, said electro-optical device being disposed in at least one of such points of intersection.

2. Apparatus as claimed in claim 1, in which the electro-optical device has a rectangular cross section and is arranged diagonally in a surrounding optical structure of transparent material closely surrounding it and forming the reflecting means.

3. Apparatus as claimed in claim 2, in which limited portions of the outer sides of the surrounding optical structure are angled with respect to the remaining portions of the exterior sides for deflecting the partial beams into and out of the electro-optical device and the optical structure, respectively.

4. Apparatus as claimed in claim 1, in which the electro-optical device includes a potassium dihydrogenphosphate crystal.

5. Apparatus as claimed in claim 4, in which the potassium dihydrogenphosphate is deuterium doped.

6. The apparatus as claimed in claim 5, wherein said crystal is so cut and oriented that the partial beam paths are essentially normal to the optical axis and parallel to the axes $x'_1$ and $x'_2$ of the index ellipsoid of the crystal.

7. The apparatus as claimed in claim 4, wherein said crystal is so cut and oriented that the partial beam paths are essentially normal to the optical axis and parallel to the axes $x'_1$ and $x'_2$ of the index ellipsoid of the crystal.

8. An optical interferometric apparatus with an electrically controllable intensity transmission factor between at least one radiation beam entrance and at least one radiation beam exit, comprising:
   a beam splitter which receives a beam of optical radiation from said entrance and splits the received beam into first and second coherent partial beams, projecting those partial beams along first and second partial beam paths respectively;
   a beam combining device which receives said partial beams from said partial beam paths and combines them into at least one combined beam having a predetermined cross section;
   said beam combining device and said partial beam paths being arranged to combine said partial beams strictly parallel with each other so that the combined beam has an essentially constant phase across its cross-section;
   said combined beam being passed from said combining device to said radiation beam exit through a combined beam path free of any diffraction-fringe space-selective element;
   reflecting means, in each of the partial beam paths, for directing the partial beams so that they intersect at least once, the reflecting means including a 180° reflector in each path so that each partial beam is reflected directly back along its path; and
   an electro-optical device positioned in an intersection of said partial beam paths, said device having an electrically controllable index of refraction to vary the optical lengths of said partial beam paths.

9. Apparatus as claimed in claim 8, in which the electro-optical device includes a potassium dihydrogenphosphate crystal.

10. Apparatus as claimed in claim 9, in which the potassium dihydrogenphosphate crystal is deuterium doped.

11. The apparatus as claimed in claim 10, wherein said crystal is so cut and oriented that the partial beam paths are essentially normal to the optical axis and parallel to the axes $x'_1$ and $x'_2$ of the index ellipsoid of the crystal.

12. The apparatus as claimed in claim 9, wherein said crystal is so cut and oriented that the partial beam paths are essentially normal to the optical axis and parallel to the axes $x'_1$ and $x'_2$ of the index ellipsoid of the crystal.

13. Apparatus as claimed in claim 8, in which the electro-optical device has a rectangular cross section and is arranged diagonally in a surrounding optical structure of transparent material closely surrounding it and forming at least a portion of the reflecting means.

14. Apparatus as claimed in claim 13, in which limited portions of the outer sides of the surrounding optical structure are angled with respect to the remaining portions of the exterior sides for deflecting the partial beams into and out of the electro-optical device and the optical structure, respectively.

* * * * *